United States Patent
Bennett

(10) Patent No.: US 12,435,446 B2
(45) Date of Patent: Oct. 7, 2025

(54) SYSTEM AND METHOD FOR CREATING AN OBJECT WITH A CONDUIT WITH PARTICULAR VASCULAR APPLICATIONS

(71) Applicant: Frontier Bio Corporation, Hayward, CA (US)

(72) Inventor: Eric Bennett, Oakland, CA (US)

(73) Assignee: Frontier Bio Corporation, Hayward, CA (US)

( * ) Notice: Subject to any disclaimer, the term of this patent is extended or adjusted under 35 U.S.C. 154(b) by 710 days.

(21) Appl. No.: 17/467,340

(22) Filed: Sep. 6, 2021

(65) Prior Publication Data

US 2022/0074075 A1   Mar. 10, 2022

Related U.S. Application Data

(60) Provisional application No. 63/075,242, filed on Sep. 7, 2020.

(51) Int. Cl.
*A61F 2/06* (2013.01)
*A61F 2/02* (2006.01)
(Continued)

(52) U.S. Cl.
CPC ........... *D01D 5/0076* (2013.01); *A61F 2/022* (2013.01); *A61F 2/062* (2013.01); *B29C 70/326* (2013.01);
(Continued)

(58) Field of Classification Search
CPC ....... D01D 5/0076; D01D 11/00; A61F 2/062; B33Y 80/00; B33Y 40/20; B33Y 50/00
See application file for complete search history.

(56) References Cited

U.S. PATENT DOCUMENTS

2003/0028246 A1   2/2003   Palmaz et al.
2011/0008405 A1   1/2011   Birdsall et al.
(Continued)

FOREIGN PATENT DOCUMENTS

CA          2723141 A1 *  11/2009   ............ A61L 27/18
IN     201821042296          9/2019
(Continued)

OTHER PUBLICATIONS

Villadolid et al., "Custom tissue engineered aneurysm models with varying neck size and height for early stage in vitro testing of flow diverters," Journal of Materials Science: Materials in Medicine, Mar. 2020, 31, 12 pages.
(Continued)

*Primary Examiner* — David H Willse
(74) *Attorney, Agent, or Firm* — Sheridan Ross P.C.

(57) ABSTRACT

According to an embodiment of the disclosure, a method of creating an object with a conduit is disclosed. A material is deposited on a sacrificial collector; and, the sacrificial collector is then removed to create the object with the conduit. Both the object and the sacrificial collector can approximate the shape of desired blood vessel. The method can also include a 3-D printing of the desired shape of the mold and utilization of gallium as the sacrificial collector. The sacrificial object is created by insertion of the gallium in the mold. After removal of the gallium from the mold, fibers are electrospun onto the gallium. The gallium is removed through melting—leaving a scaffold, the object with the conduit. In addition to the gallium, an extra sacrificial layer of a water-soluble material may be utilized.

18 Claims, 7 Drawing Sheets

Two 3-D printed mold pieces (A) are compressed together (B) and molten gallium is cast into the cavity. The solidified gallium (C) is removed from the mold and nanofibers are electrospun onto it (D). The gallium is melted out, leaving only the hollow nanofibrous scaffold (E) in the desired shape which is then seeded with cells and matured (F) in a bioreactor.

(51) Int. Cl.
  *B29C 70/32* (2006.01)
  *C12M 3/00* (2006.01)
  *C12M 3/04* (2006.01)
  *D01D 5/00* (2006.01)
  *D01D 11/00* (2006.01)
  *A61F 2/07* (2013.01)
  *B33Y 80/00* (2015.01)

(52) U.S. Cl.
  CPC ............. *C12M 21/08* (2013.01); *D01D 11/00* (2013.01); *A61F 2002/065* (2013.01); *A61F 2002/077* (2013.01); *A61F 2240/004* (2013.01); *B33Y 80/00* (2014.12)

(56) References Cited

U.S. PATENT DOCUMENTS

| | | | |
|---|---|---|---|
| 2014/0023812 A1* | 1/2014 | Hammer | F16L 9/128 428/36.9 |
| 2016/0030215 A1 | 2/2016 | Taylor et al. | |
| 2016/0287756 A1 | 10/2016 | Lewis et al. | |
| 2017/0072105 A1 | 3/2017 | Jeffries et al. | |
| 2018/0214614 A1* | 8/2018 | Yoo | A61L 27/52 |

FOREIGN PATENT DOCUMENTS

| | | | |
|---|---|---|---|
| JP | S54-151675 | 11/1979 | |
| JP | 2015-34006 | 2/2015 | |
| JP | 2018-538082 | 12/2018 | |
| WO | WO 2019/021292 | 1/2019 | |
| WO | WO-2019222797 A1 * | 11/2019 | B22C 9/04 |

OTHER PUBLICATIONS

Huling et al., "Fabrication of biomimetic vascular scaffolds for 3D tissue constructs using vascular corrosion casts," Acta Biomaterialia, Mar. 1, 2016, 32:190-7.

PCT International Search Report and Written Opinion in International Appln. No. PCT/US2021/049182, dated Dec. 22, 2021, 14 pages.

* cited by examiner

Two 3-D printed mold pieces (A) are compressed together (B) and molten gallium is cast into the cavity. The solidified gallium (C) is removed from the mold and nanofibers are electrospun onto it (D). The gallium is melted out, leaving only the hollow nanofibrous scaffold (E) in the desired shape which is then seeded with cells and matured (F) in a bioreactor.

A

B

Close-up of the gallium after solidifying overnight and being removed from the mold.

The scaffold after the gallium was melted out.

SYSTEM AND METHOD FOR CREATING AN OBJECT WITH A CONDUIT WITH PARTICULAR VASCULAR APPLICATIONS

RELATED APPLICATIONS/PRIORITY

This application claims priority to U.S. Provisional Application No. 63/075,242 (filed on Sep. 7, 2020). The Application incorporates this Provisional Application by reference herein for all purposes.

FIELD OF USE

The present invention relates to manufacturing techniques for 3D structures. More specifically, this disclosure is directed to a system and method for creating an object with a conduit with particular vascular applications.

BACKGROUND

As the leading cause of death worldwide, cardiovascular diseases have a heavy impact on society. Current treatments for these conditions consist of revascularization techniques such as angioplasty, stents, or surgical bypass grafting. Vascular bypass grafting is the cornerstone of revascularization for ischemic heart disease and peripheral vascular disease. Autologous vessels, such as the saphenous vein and internal thoracic artery, represent the gold standard of grafts for small-diameter vessels, but obtaining one brings additional risks. It necessitates an invasive procedure performed on an already sick patient. The grafts must be replaced every 10-15 years, and they are not easily available in patients with widespread systemic vascular disease. In the United States alone, 1.4 million arterial bypass operations are performed annually, but ~100,000 patients have no suitable autologous arteries or veins.

The invasive and non-lasting nature of autologous grafts is causing researchers to opt for tissue-engineered vascular grafts (TEVGs). Although promising, this technology has yet to meet its full potential.

BRIEF DESCRIPTION OF THE DRAWINGS

For a more complete understanding of this disclosure and its features, reference is now made to the following description, taken in conjunction with the accompanying drawings, in which.

SUMMARY OF THE DISCLOSURE

Figure 1:
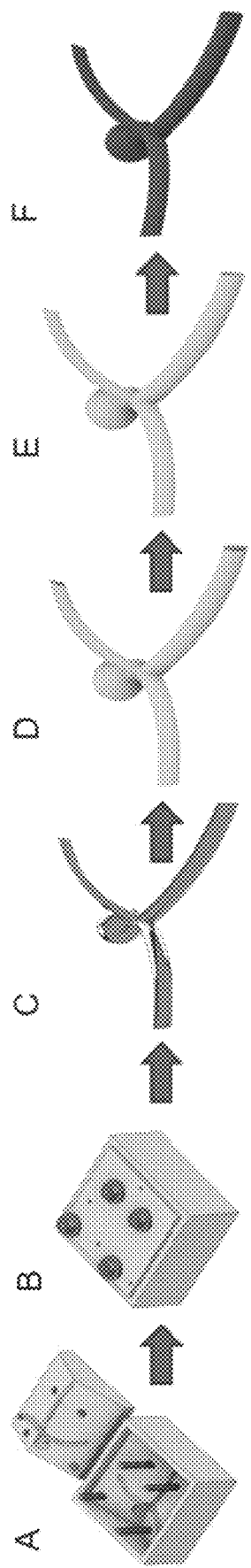
FIG. 1 discloses a method, according to an embodiment of the disclosure.

According to an embodiment of the disclosure, a method of creating an object with a conduit is disclosed. A material is deposited on a sacrificial collector; and, the sacrificial collector is then removed to create the object with the conduit. Both the object and the sacrificial collector can approximate the shape of desired blood vessel. The method can also include a 3-D printing of the desired shape of the mold and utilization of gallium as the sacrificial collector. The sacrificial object is created by insertion of the gallium in the mold. After removal of the gallium from the mold, fibers are electrospun onto the gallium. The gallium is removed through melting-leaving a scaffold, the object with the conduit. In addition to the gallium, an extra sacrificial layer of a water-soluble material may be utilized.

As used herein, the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The phrase "at least one of," when used with a list of items, means that different combinations of one or more of the listed items may be used, and only one item in the list may be needed. For example, "at least one of: A, B, and C" includes any of the following combinations: A; B; C; A and B; A and C; B and C; and A and B and C. Definitions for certain words and phrases are provided throughout this patent document, those of ordinary skill in the art should understand that in many if not most instances, such definitions apply to prior, as well as future uses of such defined words and phrases.

DETAILED DESCRIPTION

The FIGURES described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system. Additionally, the drawings are not necessarily drawn to scale.

While particular advantages of particular embodiments will be described, it should be understood that some embodiments may have some, none or all of such described advantages. And, some embodiments may have yet additional described advantages.

Brief Overview

As the leading cause of death worldwide, cardiovascular diseases have a heavy impact on society. Current treatments for these conditions consist of revascularization techniques such as angioplasty, stents, or surgical bypass grafting. Vascular bypass grafting is the cornerstone of revascularization for ischemic heart disease and peripheral vascular disease. Autologous vessels, such as the saphenous vein and internal thoracic artery, represent the gold standard of grafts for small-diameter vessels, but obtaining one brings additional risks. It necessitates an invasive procedure performed on an already sick patient. The grafts must be replaced every 10-15 years, and they are not easily available in patients with widespread systemic vascular disease. In the United States alone, 1.4 million arterial bypass operations are performed annually, but ~100,000 patients have no suitable autologous arteries or veins.

The invasive and non-lasting nature of autologous grafts is causing researchers to opt for tissue-engineered vascular grafts (TEVGs). Although promising, this technology has yet to meet its full potential.

Among many drawbacks, TEVGs struggle to mimic the geometric complexity and composition of natural blood vessels. At present, technology is limited to flat sheets or cylinders, which resemble only a fraction of human physiology.

Given these difficulties, an ideal vascular graft (and method of making) is disclosed that possesses mechanical strength, conforms to natural biologic conditions, and can be manufactured in a variety of shapes. The graft mimics the complex geometries and characteristics of the human body and can be personalized to an individual patient. Such a unique and versatile method of making the grafts disclosed herein is a valuable tool to medical researchers and physicians. As non-limiting examples, blood vessel mimics can be used for the pre-clinical testing of various devices that aim to treat cardiovascular diseases, limiting the need (and costs) associated with animal studies. In addition, the engineered blood vessels disclosed herein could be implanted into patients, directly treating cardiovascular disease.

As a brief overview, a particular embodiment of the disclosure involves 3-D printing a mold, and then casting gallium into it. The shape of the cast gallium resembles a solid version of the desired blood vessel geometry. The cast gallium is removed after it hardens and is used as a collector during the electrospinning of fibers which creates a fibrous scaffold on the gallium's surface. The gallium is then melted away, leaving behind a hollow fibrous scaffold. Endothelial, smooth muscle, and/or mesenchymal stem cells can then be adhered to the fibrous scaffold. Over time, the cells proliferate and create an extracellular matrix (ECM), resulting in a blood vessel (or blood vessel mimic) of the desired shape.

Gallium is chosen in particular embodiments as the collector material because it can be cast into a wide variety of desired shapes. Gallium can be melted at a temperature lower than the melting temperature of PCL (30° C. vs. 60° C.), and it is conductive, so it can act as a collector for electrospinning. The lower melting point of gallium is important because PCL nanofibers will lose their excellent affinity for cell adhesion if deformed with high temperatures near PCL's melting point. For experiments that do not involve PCL nanofibers, and instead involve polymers with a higher melting temperature, the gallium can be melted out at a higher temperature to speed up the gallium removal process. While gallium is described in particular embodiments described herein, it should be expressly understood that other embodiments may use other materials—some of which operate in a substantially similar matter to gallium and others that slightly vary from gallium's properties.

Non-limiting examples of others that may be included are wax and wax doped with conductive particles as well as ice, graphene oxide solutions, graphite, carbon (crumbled or crushed), sand/particles/dust/powder, and conductive polymers. As well as alloys of gallium, or other metals and their alloys, including but not limited to, bismuth or indium-based alloys.

Additionally, while certain embodiments will describe "melting" a substance in order to remove such a material, other embodiments may alternatively dissolve the materials in order to remove such a material.

As non-limiting examples of the foregoing, other methods of removing an object (which may be referred to as a sacrificial object or sacrificial collector) include, but are not limited to dissolving with a solvent (e.g., water, PBS, blood, acetone, HFIP, ethanol, acids, and the like), melting (e.g. in not only ambient, but also sub-ambient pressures), scraping, deflating, evaporating (e.g., including in a vacuum), degrading (e.g., enzymatic degradation, organism-based degradation, cell-based degradation, network scission, chain scission, or chelation), centripetal force, mechanical separation (separately made pieces that connect together and disconnect), and the use of stimuli-responsive materials (e.g., pH, ionic strength, electrically-induced degradation, magnetic, radiation-based degradation, and ultrasonic degradation). Also, any of the above may also include a washing step.

With reference to sub-ambient pressures (or vacuums), the reduction in pressure reduces the melting or evaporation point-allowing a reduced temperature for the requisite phase change.

Certain descriptions of making/forming sacrificial objects or the molds for the sacrificial object are provided below. While certain ones will be described, others can be used including, but not limited to 3D printing (e.g., SLA, FDM, Sintering, and the like), soft lithography, molding/casting, vacuum forming, grown, glass blowing, weaving, sculpting, stamping, spin coating, carving, CNC, sintering, freezing/freeze drying/flash freezing, other additive techniques, other subtractive techniques, and any combination of the preceding.

The mold for the sacrificial collector itself may also be sacrificial. Due to the high value of complex geometry in the collector, shapes and forms that are not possible to remove from a conventional mold may be desirable. A 3D printed mold that is then chemically removed with a process that does not interact with the collector material is one embodiment that is envisioned. The sacrificial collector material and sacrificial mold material would be selected to allow the removal of the mold without significantly impacting the geometry or other important properties of the sacrificial collector.

As non-limiting examples of the foregoing, other methods of removing a sacrificial mold include, but are not limited to; dissolving with a solvent (e.g., water, PBS, blood, acetone, HFIP, ethanol, acids, and the like), melting (e.g. in not only ambient, but also sub-ambient pressures), scraping, deflating, evaporating (e.g., including in a vacuum), degrading (e.g., enzymatic degradation, organism-based degradation, cell-based degradation, network scission, chain scission, or chelation), centripetal force, mechanical separation (separately made pieces that connect together and disconnect), and the use of stimuli-responsive materials (e.g., pH, ionic strength, electrically-induced degradation, magnetic, radiation-based degradation, and ultrasonic degradation). Also, any of the above may also include a washing step.

Particular Details

As alluded to above, cardiovascular diseases are the leading cause of death worldwide, and their incidence is predicted to increase in the coming decades. The impact of these diseases is great, costing the United States healthcare system $219 billion each year, including the price of healthcare services, medicines, and lost productivity due to death. Cardiovascular disorders are often associated with the narrowing or blocking of blood vessels, reducing blood flow, limiting nutrient supplies, and damaging tissue. They can present in many forms, including coronary heart disease, cerebrovascular disease, peripheral arterial disease, and deep vein thrombosis.

Bypass graft surgery is a common treatment for cardiovascular disease. Most involve the replacement of diseased blood vessels with a graft of an autologous artery or, more commonly, the saphenous vein. Although effective in some regards, such autologous replacements have limited availability, require invasive procedures for harvest, and must be replaced every decade. In patients with severe vascular disease, these natural autologous substitutes are not always available. For pediatric patients, a bypass graft surgery every decade would be a daunting, lifelong prospect. Further, branched vascular grafts are required for a number of indications including hand superficial palmar arch reconstruction, reconstruction of congenital vascular/cardiac anomalies, and coronary artery bypass grafting. Using available autologous grafts to reconstruct branched vessels prolongs the surgery and may increase the risk of post-operative complications.

Because of the drawbacks associated with autologous grafts, many researchers are looking to TEVGs as a promising alternative. Early versions of these TEVGs used synthetic materials like ePTFE, Dacron®, and polyurethane. These materials provide ease and flexibility of tailoring to graft design and have proven effective for the replacement of large- and medium-diameter arteries, such as the carotid or common femoral artery. However, these materials are limited by poor elasticity, low compliance, and the thrombogenicity of synthetic surfaces, making them unsuitable for grafts <6 mm in diameter.

To combat these issues with synthetic TEVGs, many researchers now use biodegradable polymers as scaffolds on which layers of cells are grown. As the scaffold degrades, it is replaced and remodeled by the ECM secreted by the cells. The ECM is a major constituent of the outer layer of blood vessels, and it includes elastin and collagen fibers. The fibrous structure of the ECM not only contributes to the mechanical integrity but also to the elasticity of the blood vessels. For instance, recoil of the elastic fibrous arterial wall during diastole facilitates the continuation of blood flow. In addition, elastic fibers in the elastic laminae layer of blood vessels contribute to the concentric arrangement of the smooth muscle cells.

Currently, electrospinning is the method of choice for creating nanofibrous blood vessel scaffolds. However, the geometries of electrospun nanofibrous scaffolds are limited to flat sheets and cylinders that do not resemble natural human blood vessel shapes. If the desired scaffold has a complex geometry, the researchers and manufacturers have to resort to using tedious post processing methods that still have geometric limitations, suffer from inaccurate geometries, and/or have deficient fiber characteristics.

The inability of artificial vascular grafts to mimic the complexity and diversity of organic biological shapes is a major challenge facing the field. The United States Food and Drug Administration recommends that medical devices such as stents, especially those designed for coronary purposes, should simulate worst-case scenarios of tortuous anatomies. They should be able to accommodate for bends or bifurcations of vessels, and they should be tested in mock vessels representative of the most challenging anatomies observed clinically.

Vascular grafts according to particular embodiments are long-lasting and functionally viable synthetic blood vessels, designed to mimic the organic geometry of a native blood vessel while maintaining and promoting biological functions at a microlevel. In particular configurations, such technology possesses mechanical strength and is able to withstand long-term hemodynamic stresses. It would be non-toxic, non-immunogenic, biocompatible, resistant to thrombosis, and available in various sizes and shapes for emergency care.

Embodiments of the disclosure also provide a more versatile method for developing artificial vascular grafts for the treatment of cardiovascular conditions. The unique method has the ability to create blood vessels and blood vessel mimics that replicate the shape and complexity of a variety of natural blood vessel geometries. A non-limiting example of the overview of the steps follows. While such general level steps are provided, additional or less steps may be provided. Such steps may generally be seen with reference to FIG. 1 below-along with further details corresponding to such steps.

Steps
1. 3-D printing of a custom mold
2. Casting molten gallium into the mold to create a desired blood vessel shape composed of gallium, and allowing the gallium to cool and solidify
3 Removing the solidified cast gallium from the mold
4. Electrospinning nanofibers onto the cast gallium
5. Melting out the gallium to leave behind a nanofibrous scaffold of the desired shape
6. Seeding the scaffold with cells
7. Allowing the cells to proliferate over several weeks to form ECM After these steps, the resulting blood vessel mimics would be suitable for the testing of devices such as flow diverters, stents, and aneurysm coils. And, in particular configurations, blood vessels or scaffolds may be suitable for implantation.

While other technologies are limited to simple shapes, the present disclosure allows for the creation of vessels that follow the complex structures of native blood vessels. This means that the disclosed designs could be used for a wide range of cardiovascular applications. In cases where multiple grafts are needed (e.g. double, triple, and quadruple bypass grafts), the disclosed method allows for the creation of a single branched graft that would reduce surgical time, limits the number of incision points (sites where the graft is sewn), and removes the need to harvest one or multiple veins/arteries from another part of the body. This is only one example of several possible applications. Additional applications that require complex fiber scaffolds where this disclosure would have applicability include the forming of complex organic structures, such as human or animal tissues and organs. Yet additional applications will become apparent to one of ordinary skill in the art after review of the disclosure.

The global tissue engineering and regeneration market is expected to reach $109.9 billion by 2023 at a CAGR of 34.8%. Due to its cost efficiency, 3-D printing is considered a novel tissue engineering strategy and has become one of the top drivers of the market.

The global tissue engineering market growth is expected to be further enhanced by an increased focus on tissue engineering-based therapies. The application of nanotechnology and, specifically, the 3-D designing of nanofibers to aid cell regeneration has propelled the growth of tissue engineering products. Accordingly, the nanofibrous material market was valued at $3.6 billion in 2018.

A gap exists between the need for bioengineered blood vessels and the limited range of clinically usable options. About 100,000 patients each year who need a graft do not have suitable autologous arteries or veins. Yet, the demand for vascular tissue repair continues because of the persistence of ischemic diseases, such as atherosclerosis. In the United States alone, 1.4 million patients need arterial replacements each year, treatments that cost a total of $25 billion.

Currently, companies have to perform expensive initial device tests in animals because sufficient blood vessel mimics do not exist. The disclosed blood vessel mimics will provide an alternative, inexpensive option for device testing without animals. This will improve animal welfare while helping companies to save thousands of dollars and detect issues early before committing time and money to complex animal studies.

Another market availing from this disclosure is the implantation of engineered blood vessels in patients for the treatment of cardiovascular diseases such as peripheral arterial disease and coronary heart disease. To treat these illnesses, an estimated 340,000 coronary artery bypass grafting (CABG) procedures are performed each year in the United States. CABG is one of the most commonly performed cardiovascular surgeries, so there is ample space for the introduction of our unique technology into this market. The projected cardiovascular regeneration market is expected to reach $4.14 billion by 2023.

Currently, the gold standard for CABG procedures is the use of autologous vessels, such as the saphenous vein. However, an additional surgery is needed for harvesting the autologous graft, which is often found to be unsuitable for use. The disclosure herein has a personalized graft design that has structural and functional characteristics of natural vessels without the complications associated with autologous grafts.

The disclosed technology aims to closely recreate the microstructure of native blood vessels by creating nanofibrous scaffolds with complex macro geometries. Existing alternative options cannot achieve these complex nanofibrous structures.

The disclosed innovation is a simple alternative to current methods for manufacturing nanofibrous blood vessel scaffolds with complex, irregular, or customized geometries.

FIG. 1 discloses a method, according to an embodiment of the disclosure. Two pieces of a mold are shown with reference to label A. In particular configurations, the mold pieces may be 3-D printed using a variety of techniques that will become apparent to one of ordinary skill in art after review of this specification. As non-limiting examples, both additive and removal techniques may be utilized to create a desired shape of an object that will be sacrificially utilized. Further examples are provided below. While two mold pieces are shown here, more than two pieces may be used in other configurations.

With reference to label B, the casting of molten gallium is shown. While gallium is described in this particular configuration, a variety of other materials may also be utilized as described below. A.

With reference to label C, after the gallium solidifies, its shape resembles the desired blood vessel geometry (in this case, a bifurcated aneurysm with complex curvature and variable diameter). In particular configurations, in addition to the gallium, another material may be added as described below as an additional sacrificial layer. For example, the gallium can be coated with another sacrificial layer that acts to protect the fibers described below from contacting and being exposing to the gallium directly. Non-limiting example methods to deposit the sacrificial layer include electrospraying or electrospinning, or any other spray method, or dip coating. Others will become apparent to one of ordinary skill in the art after review of this specification. The sacrificial layer could be any kind of water-soluble material such as PEG (polyethylene glycol), water-soluble wax, and the like. In particular configurations, the gallium provides the structural foundation for the particular desired design while the additional sacrificial layer protects against the particular interaction between the gallium and fiber. In this way, the use of different materials may both be utilized—both of which will be sacrificially removed after fiber coating.

With reference to label D, nanofibers are electrospun onto the solidified gallium and the gallium is melted out. Where additional layers are used, such additional layers can also be removed. As referenced below, while electrospinning is described in particular configurations, others configurations may use other techniques of applying the fibers to the sacrificial collector-here, the gallium and potentially another layer.

After the removal of the gallium (and additional layers, if utilized), what is left is a nanofibrous scaffold with the desired geometry as shown with reference to label E. Electrospinning requires a conductive collector that needs to be removed after nanofiber deposition. This is why gallium is useful: it is conductive (so can act as a good collector in the electrospinning process) and can be easily removed from the electrospun scaffold by melting at a temperature above 30° C. and below the melting temperature of common polymers used in tissue engineering (such as PCL).

With reference to label F, the nanofibrous scaffold is then seeded with cells that create ECM over time while proliferating in a bioreactor. After several weeks, the vessel is ready for use—including use for research and development purposes. Depending on the geometry and compatibility, the scaffold or the grown vessel could also be used for medical purposes (implantation).

The disclosed technique overcomes the geometric limitations of other procedures that use 3-D printed metal, machined collectors, shaped aluminum foil, or machined molds. In one technique, a grounded spinning rod outfitted with a small, compressed piece of aluminum foil is used as the electrospinning collector. The metal rod represents the blood vessel and the aluminum foil represents the aneurysm growth. Nanofibers are electrospun onto the rod and aluminum foil simultaneously as they rotate.

The major problem with this method arises when the rod is to be removed. The aluminum foil is trapped inside the aneurysm shape, locked in place by the electrospun nanofibers. An incision is made in the nanofibrous scaffold and the foil is removed. The incision leaves an undesired opening in the scaffold. The rod is inserted back into the scaffold and electrospinning is started again. This covers up the incision with more nanofibers, but it leaves an undesired thickness where the incision used to be. The method also fails to smooth the incision on the inside of the scaffold. This is a laborious process, causing unwanted geometric defects and limited to a very simple shape. Workarounds exist, but they result in limited geometries and require laborious post processing.

The existing and insufficient practices for making custom shaped TEVGs validates the need for the disclosed technology. In particular, this technology has the potential to unlock geometries that could not be achieved with other methods and minimize the number of post-processing steps.

A critical factor in the success of the implanted TEVGs is their ability to mimic the natural microenvironment of the ECM. Electrospinning is considered one of the most flexible scaffold-fabrication methods. Electrospinning allows for a high range of flexibility in designing the composition of nanoscale fibers and their associated mechanical and biological functions to mimic the natural microenvironment of the extracellular matrix. Electrospinning allows for the formation of a 3-D network made of fibers with a diameter ranging from 50-500 nm, the size range that is found in natural tissues. Our usage of casting gallium into a 3-D printed mold refines this technique further by allowing the collector geometry to be more complex than a sheet or cylinder. This invention unlocks the ability to create nanofiber scaffolds in a virtually unlimited number of shapes.

Attempts at mimicking more complex structures have been tried to varying degrees of success. Tiffany W. Shen, et al. developed and tested scaffolds for blood vessel mimics of fusiform and saccular aneurysm geometries. They were seeded with cells and used to test flow diverters. Although this method successfully created aneurysm blood vessel mimics in multiple geometries, the method was time consuming due to the need for using CNC machining processes and the method could not be adapted to a wide range of geometries.

A study by Chavez, et al. grew cells on ePTFE scaffolds in bioreactors. The scaffolds had complex geometries, with some branched and curved options, on which cells were deposited consistently across. Although a success, this method was limited by its use of ePTFE, which does not exhibit elastic modulus similar to native arteries, is not bioresorbable, and has a low patency over time.

Fukunishi, et al. 3-D printed stainless steel in the shape of the desired blood vessel, and then electrospun nanofibers onto it. This resulted in a simple cylindrical shape that was slightly bent and suffered the same limitations as other techniques, including a limited geometry because researchers have to remove the 3-D printed steel after electrospinning without being able to melt it out.

The disclosure provides a modified electrospinning method using gallium-based collectors and can be used to create nanofibrous scaffolds with complex geometries that are impossible or challenging to make using traditional electrospinning methods. Furthermore, the disclosed method may be used to engineer nanofibrous scaffolds from multiple biomaterials and polymers that can be biocompatible.

Experiment

Figure 2A:
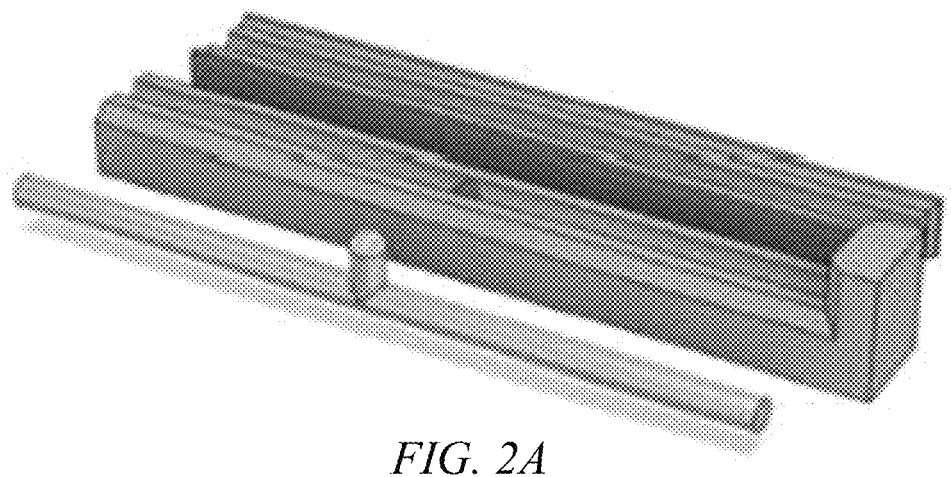
FIGS. 2A and 2B show images of a computer-aided design (CAD) and real images of a of a 3-D printed mold and gallium piece obtained therefrom.
Figure 2B:
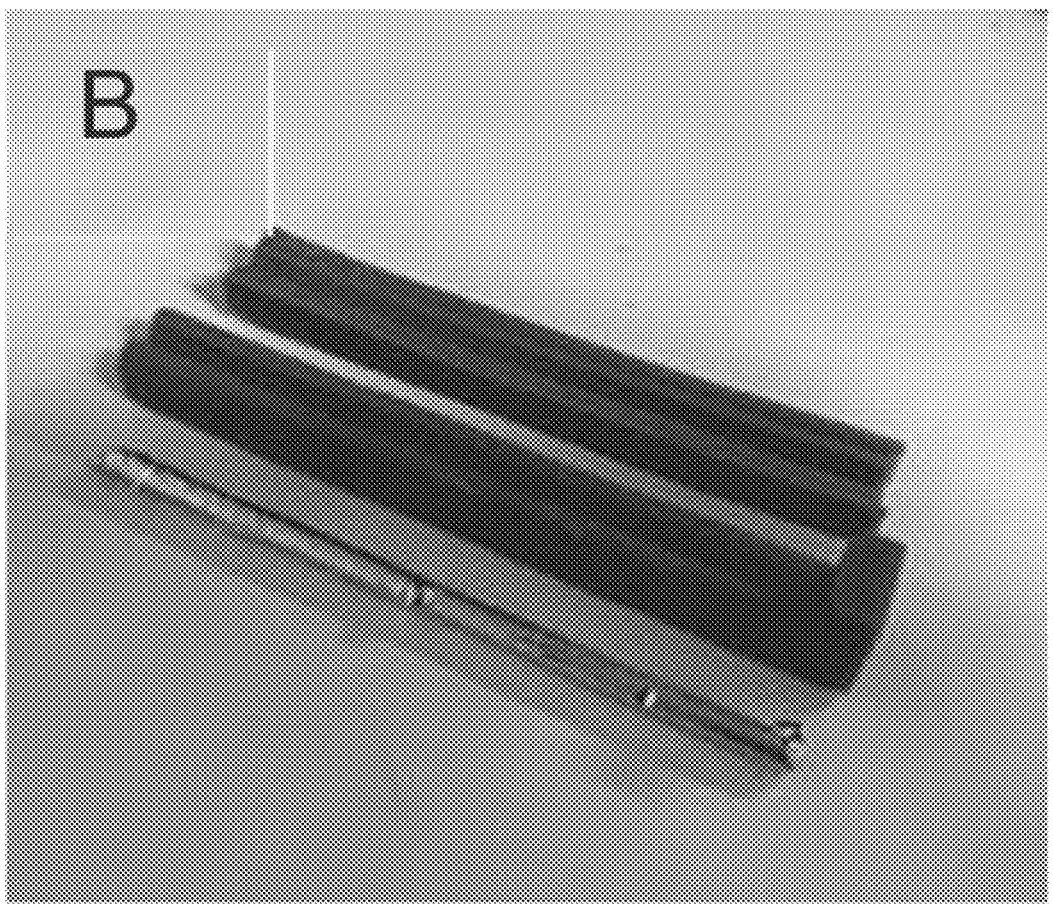

The Applicant conducted an experiment to obtain preliminary data on the process of creating a gallium-based collector. The Applicant 3-D printed a mold and then cast molten gallium into it (FIG. 2A). The cavity in the mold was shaped like a 4 mm blood vessel with a small aneurysm. The gallium was removed after solidifying overnight (FIG. 2B).

The Applicant electrospun polycaprolactone (PCL) onto the cast gallium, using the gallium as the collector. The PCL was at 14% w/v and was electrospun at a distance of 6 inches with a flow rate of 0.1 mL/min. The voltage started at 12 kV and was increased to 18 kV after 10 minutes. The gallium was held at 0 volts (grounded) and was rotated slowly (60 RPM). The needle moved above the gallium, translating back and forth to even the spread of nanofibers along the length of the gallium collector. The total time taken to complete this process was 20 minutes.

Figure 2C:
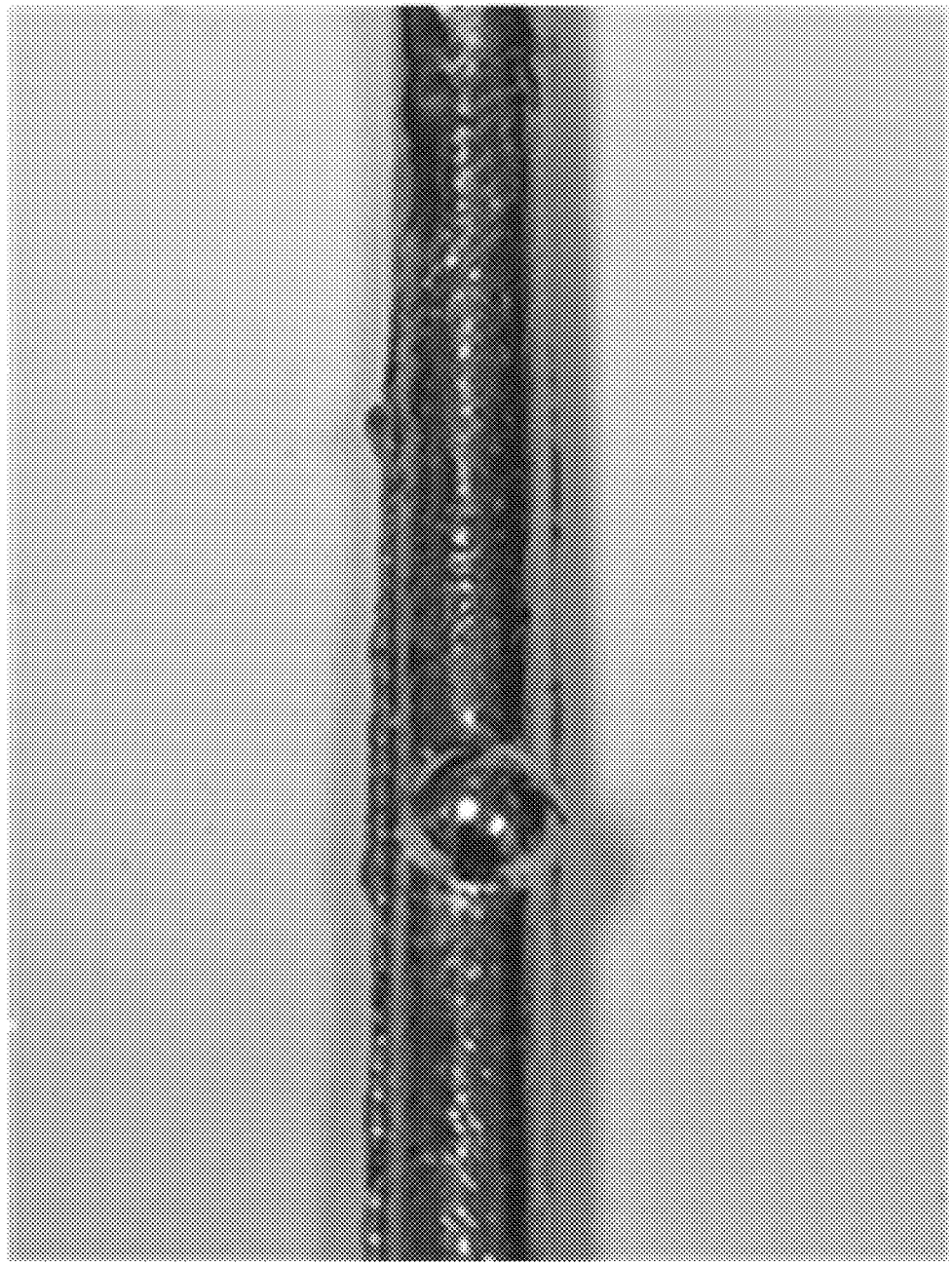
FIG. 2C shows a close-up image of gallium after solidifying overnight and being removed from the mold.
Figure 2D:
FIG. 2D shows an image of the scaffold after the gallium was melted out.

The gallium and scaffold were placed into a rotating oven at 38° C., and large amounts of the gallium melted out after 30 minutes with the help of manual agitation. The process was repeated twice until all of the gallium had melted and was removed, leaving behind a nanofibrous blood vessel scaffold (FIG. 2D). Representative images of the steps for creating a gallium-based collector are shown in FIGS. 2A-2D, according to an embodiment of the disclosure. In order to make a cylindrical vessel with an aneurysm, first a CAD file for the mold was designed (FIG. 2A), followed by 3D printing the mold (FIG. 2B) and casting molten gallium into the mold. The mold was placed in a compression chamber to remove the air bubbles and solidify the gallium. The gallium vessel could be seamlessly removed from the mold (FIGS. 2B and 2C). One of the common challenges during casting step is flashing. Flash, also known as casting fin or burrs, can be described as the unwanted and excess material attached to a cast where the mold pieces come into contact. To minimize flashing, the mold pieces were clamped together with bolts and nuts rather than elastic bands. Also, the 3D printed mold was created using a flexible material to allow compression forces to totally seal the space between mold surfaces and to allow much easier removal of the solidified gallium compared to non-flexible molds. Also, to prevent trapped bubble formation in the gallium, a small venting hole was designed on the mold to allow air to escape while casting the gallium. In addition, putting the mold and gallium into the compression chamber reduced the size of any remaining bubbles to the microscopic scale. The gallium collector was then loaded on our EHD printing machine and rotated at a speed of 60 rpm. Polycaprolactone (PCL) was electrospun on the collector at a distance of 6 inches. The printhead was connected to 15 kV and the collector was grounded. The needle moved above the gallium, translating back and forth to even the spread of nanofibers along the length of the gallium collector.

The gallium was removed by placing the gallium collector and scaffold in an oven at 38° C. for an hour. The nanofibrous scaffold after gallium removal is shown in FIG. 2D.

Figure 3A:
FIGS. 3A, 3B, and 3C shows gallium residue.
Figure 3B:
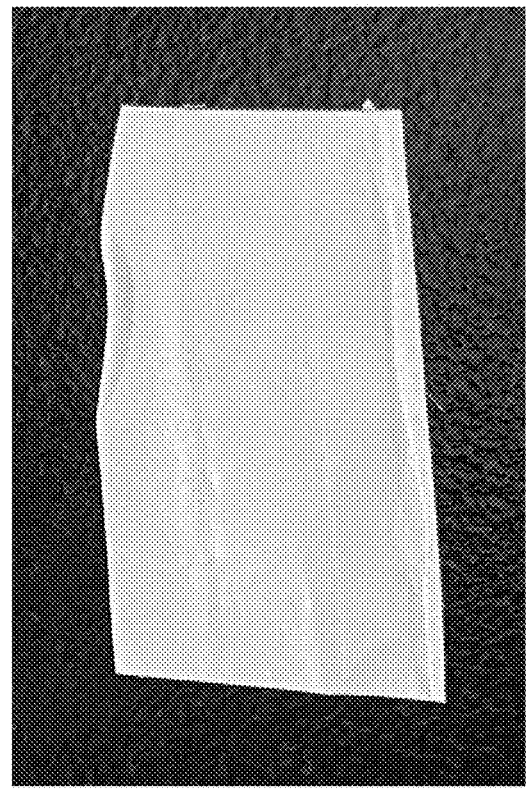
Figure 3C:
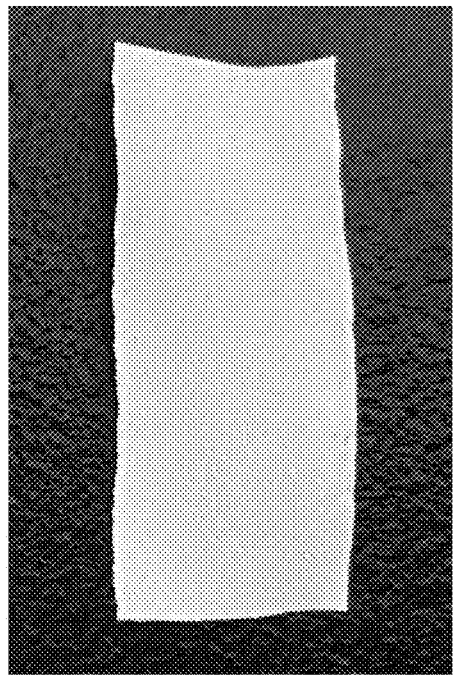
Figures 4A, 4B:
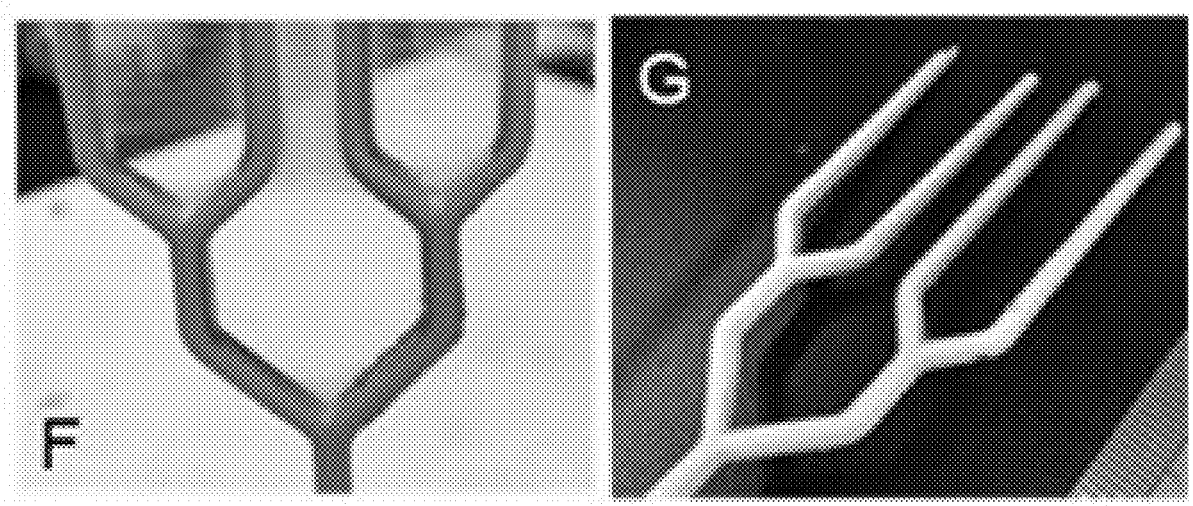
FIG. 4A shows images of branched geometries of gallium.
FIG. 4B shows images of branched geometries of fiber-covered-gallium.

In order to minimize remaining traces of gallium, a thin layer (50 µm) of water-soluble polyethylene glycol (PEG) polymer was first electrosprayed on gallium collectors followed by electrospinning the PCL. The PEG served as a protective layer to reduce direct exposure of the PCL fiber layer to the gallium and was dissolved in water after gallium removal. Our results showed that there was not any visually detectable gallium residue on the surface of the nanofibrous layer when a protective PEG layer was used (FIG. 3B). FIG. 3A shows gallium and PCL whereas FIG. 3C shows stainless steel, PCL, and no PEG. In addition, the temperature and length of the post-processing step in the oven were increased to 40° C. and 5 hours, respectively to optimize the gallium removal process. After optimizing the process to create a simple cylindrical geometry with an aneurysm (FIG. 2A-D), the method was used to create nanofibrous constructs with more complex branched geometries. One of the early observations with branched geometries was a possibility of fiber webbing (FIG. 4A) that was due to long fiber lengths and orientation of electric field in the space between two gallium branches. When the molecular weight of the PCL polymer in the formulation was reduced from 80 kDa to 24 kDa, the webbing was minimized while there was a uniform coating of gallium with continuous fibers (FIG. 4B).

Figures 5A, 5B, 5C:
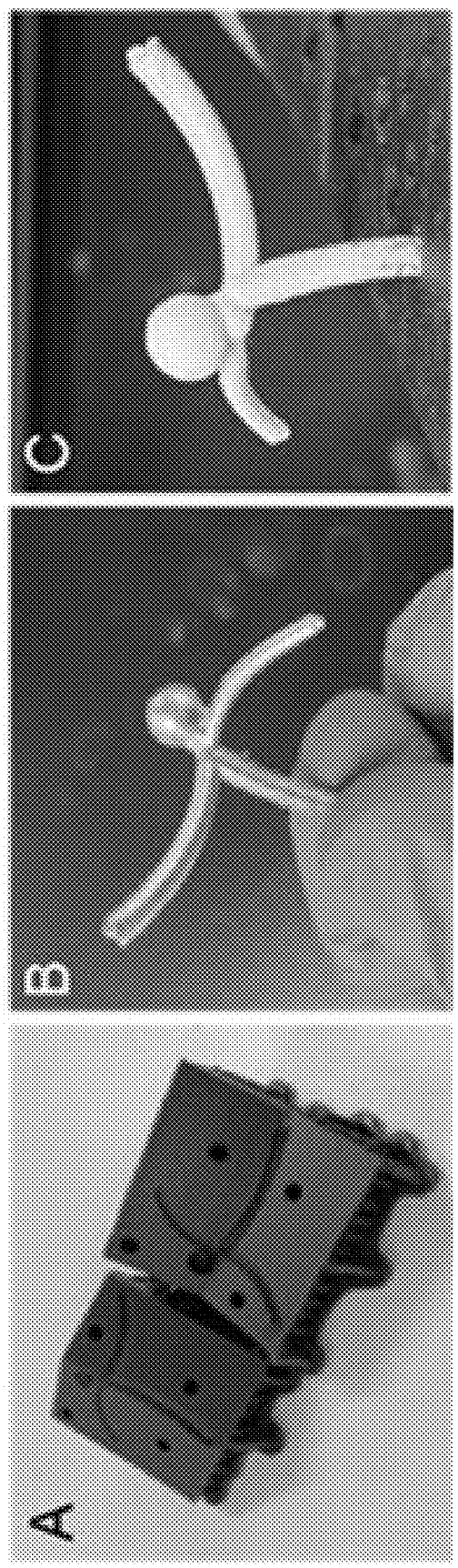
FIGS. 5A, 5B, and 5C respectively show a bifurcated geometry of a mold, gallium from the mold, and fiber-covered gallium.

The above-mentioned optimized method described with reference to FIGS. 2A-2D was used to create the constructs with a bifurcated geometry with an aneurysm (FIGS. 5A, 5B, and 5C). More particularly, FIG. 5A show a bifurcated geometry of a mold. FIG. 5B show a bifurcated geometry of gallium from the mold. FIG. 5C shows a bifurcated geometry of fiber-covered gallium.

While this disclosure has described certain embodiments and generally associated methods, alterations and permutations of these embodiments and methods will be apparent to those skilled in the art. Other changes, substitutions, and alterations are also possible without departing from the spirit and scope of this disclosure, as defined by the following claims.

What is claimed is:

1. A method of creating a fibrous scaffold with a conduit, comprising:

electrospinning fibers onto a sacrificial collector comprising a sacrificial material that is electrically conductive and a sacrificial layer on top of the sacrificial material; and removing the sacrificial collector from the electrospun fibers to thereby create the fibrous scaffold with the conduit;

wherein:

the sacrificial layer is deposited on the sacrificial material by electrospraying or electrospinning; and the material of the sacrificial layer is different than the sacrificial material.

2. The method of claim 1, wherein both the fibrous scaffold and sacrificial collector approximate the shape of a blood vessel.

3. The method of claim 2, further comprising:
seeding the fibrous scaffold with cells; and
maturing the seeded fibrous scaffold in a bioreactor to create a blood vessel mimic; or
implanting the seeded fibrous scaffold into a patient, as a vascular graft, to create a blood vessel mimic.

4. The method of claim 3, wherein the cells are endothelial cells, smooth muscle cells, or mesenchymal stem cells.

5. The method of claim 1, wherein the sacrificial material comprises gallium, a gallium alloy, bismuth, a bismuth alloy, indium, or an indium alloy.

6. The method of claim 1, further comprising:
creating the sacrificial collector by depositing the sacrificial material in a mold.

7. The method of claim 6, further comprising:
creating the mold for the sacrificial material.

8. The method of claim 7, wherein the mold is 3-D printed.

9. The method of claim 1, wherein the sacrificial collector is removed from the electrospun fibers by melting the sacrificial material.

10. The method of claim 9, further comprising, prior to the melting:
reducing an environment in which the melting occurs to a sub-ambient pressure to reduce a melting point of the sacrificial material.

11. The method of claim 1, wherein the sacrificial layer is deposited on top of the sacrificial material to protect the sacrificial material from directly interacting with the electrospun fibers deposited on the sacrificial collector.

12. The method of claim 11, wherein the sacrificial material is gallium, and the sacrificial layer is a water-soluble material.

13. The method of claim 12, wherein the water-soluble material is polyethylene glycol or a water-soluble wax.

14. The method of claim 1, further comprising:
creating the sacrificial collector by depositing the sacrificial material in a mold, removing the sacrificial material from the mold, and depositing the sacrificial layer on the sacrificial material.

15. The method of claim 1, further comprising:
rotating the sacrificial collector during the electrospinning of the fibers onto the sacrificial collector.

16. The method of claim 1, wherein the fibers are polycaprolactone fibers.

17. The method of claim 1, wherein the fibers have diameters in a range from 50 nanometers (nm) to 500 nm.

18. The method of claim 1, wherein the electrically conductive sacrificial material comprises a material selected from conductive polymers, a wax, a wax doped with conductive particles, graphene oxide particles, graphite particles, and carbon particles.

* * * * *